United States Patent [19]
Pitroda et al.

[11] 4,218,589
[45] Aug. 19, 1980

[54] METHOD AND APPARATUS FOR TESTING TONE GENERATORS

[75] Inventors: Satyan G. Pitroda, Villa Park, Ill.; Byung C. Min, Belmont, Calif.

[73] Assignee: Wescom Switching, Inc., Oak Brook, Ill.

[21] Appl. No.: 24,544

[22] Filed: Mar. 28, 1979

[51] Int. Cl.² ............................ H04J 3/12; H04J 3/14
[52] U.S. Cl. .................................. 370/13; 179/84 VF; 371/27
[58] Field of Search ......... 179/15 BF, 15 BY, 84 VF, 179/175.2 R, 175.2 A, 175.2 C, 15 AT

[56] References Cited
U.S. PATENT DOCUMENTS

| | | | |
|---|---|---|---|
| 3,582,577 | 6/1971 | Ribner | 179/175.2 R |
| 4,071,704 | 1/1978 | Moed | 179/15 BF |
| 4,132,871 | 1/1979 | Lake | 328/14 |

OTHER PUBLICATIONS
UK patent application, GB 200/228 A 1-24-79.

*Primary Examiner*—Douglas W. Olms
*Attorney, Agent, or Firm*—Leydig, Voit, Osann, Mayer & Holt, Ltd.

[57] ABSTRACT

Apparatus and methods for testing digital tone generators in a digital time division, multiplex telecommunications switching system. The tone generator produces both continuous and interrupted tones, and testing of any tone is accomplished by determining if its successive PCM words are stuck-at-dc. (SDD) and if it is an idle tone (ITD). The combinations of ITD and SDD determine whether (i) the tone generator being tested is malfunctioning, (ii) the test method or apparatus itself has failed, or (iii) the tone generator is functioning properly.

20 Claims, 4 Drawing Figures

FIG. 3.

| SDD | ITD | INTERPRETATION |
|---|---|---|
| 1 | 1 | IDLE TONE (NEED MORE INFORMATION) |
| 1 | 0 | ERROR (TONE GENERATOR IS MALFUNCTIONING) |
| 0 | 1 | ERROR (TONE MALFUNCTION DETECTOR FAILURE) |
| 0 | 0 | GOOD (TONES CHANGING) |

METHOD AND APPARATUS FOR TESTING TONE GENERATORS

BACKGROUND OF THE INVENTION

This invention relates to a digital time division, multiplex telecommunications switching system, and more particularly to a tone generator malfunction test implemented by means of a tone generator malfunction detector into which various tones may be switched.

In general, call processing by a telecommunications switching system is accomplished by connecting a terminal, for transmitting and receiving information, to another terminal by means of a switching network. In a digital time division, multiplex telecommunications switching system, the switching network, which includes an information memory, connects one terminal to another terminal "in time" by sequentially storing digital samples of information from first and second terminals in assigned locations of the information memory, swapping the two samples in time and returning the first and second samples respectively to the second and first terminals.

In providing "in time" call processing between analog information terminals, such as telephone instruments, the information transmitted by the terminals must first be sampled (to produce pulse amplitude modulated, PAM, signals) and digitally encoded by analog-to-digital (A/D) sections of code converters. The resulting successive digital samples (multi-bit binary words which represent data viewable as numbers (and which are pulse code modulated, PCM) from each terminal are placed in a particular time channel of successive frames in the switching system. That is, the digital samples, at A/D section outputs, are time multiplexed by multiplexers in order to put several channels of information onto a single transmission path or wire with each channel occupying a dedicated time slot. Whenever a channel is idle, its time slot on the wire will simply be vacant. Time multiplexing of a number of channels serves to minimize the number of physical wires going to the information memories in the switching network. After the swapping has occurred in memory, the information is routed in reverse sequence back through demultiplexers, to digital-to-analog (D/A) sections of code converters and via D/A section outputs to the connected terminal.

The swapping of samples in the information memories is accomplished under computer control. The computer or control complex (abbreviated as "CPU") also keeps a record of the status of the switching system including the state of the terminals so as to properly process a request for service. In a system using the present invention, the computer may be distributed microprocessors as described in Pitroda et al. United States application Ser. No. 842,091 filed Oct. 17, 1977 which is a continuation-in-part of Ser. No. 734,732, filed Oct. 21, 1976, in which microprocessors control call processing and monitor the status of the system.

In connecting one telephone instrument to another, a switching system must provide progress tones, such as dial tones, ring back tones or busy tones, which serve to inform the user of the state of his telephone instrument and the progress of his call. Furthermore, in a switching system that services dual tone, multi-frequency (DTMF) telephone instruments, DTMF tones are required in the system to provide certain maintenance functions. Also other maintenance tones, such as tones used for testing the code converters may be incorporated into the switching system.

A switching system may require that a large number of different tones be made available (eighteen or more is not uncommon), each tone being provided by a different tone generator or all tones coming from a time-shared universal source as disclosed in United States application Ser. No. 931,876, filed Aug. 8, 1978 in the names of Mehta et al and assigned to the assignee of the present application. One form of digital tone generator is disclosed in U.S. Pat. No. 3,706,855 issued Dec. 19, 1972 in the names of Pitroda and Rekiere and which confirms that it is known in the art to send tones by outputting in seriatum order, during each of successive frames, the pre-formed PCM digital words of cyclic analog waves. The various tones, in terms of common characteristics, fall into two categories—continuous tones (e.g., dial tones and DTMF tones) and interrupted tones (e.g., ring back tones and busy tones), the latter having alternate on/off intervals of sound and quiet.

A malfunction of a digital tone generator, or the source of any tone, presents a unique maintenance problem within the switching system. While the tone generators are used on a system-wide basis, the failure of a tone generator may not have a calamitous effect on the switching system's performance. For example, the failure of a maintenance tone generator would have no effect at all on the system's immediate ability to process calls, but could create hours of wasted time in attempts to diagnose troubles on the assumption the correct maintenance or test tone was being used. The failure of a progress tone generator would only effect calls being initiated, but would have no effect on those already in progress. In that regard, the failure of a dial tone would be immediately apparent to a user placing a call, and undoubtedly a user complaint would result.

Keeping in mind that telephone switching equipment must have an extremely high degree of reliability, with a design goal of one hour of system down time in twenty years, it is indeed important to be able to verify that all of many tones are correctly available when needed in the system.

It is the general aim of the present invention to do away with apparatus uniquely assigned to test each of the many tones available in a PCM multiplex communication system, and to provide simple, common methods and apparatus for selectively testing each one of many digital tone signals to detect malfunctions in the tone generator equipment.

An object of coordinate significance is to provide common methods and apparatus by which malfunctions or faults in various ones of several digital tone signals may be detected, despite the fact that some tone signals represent continuous sounds and others are turned on and off to represent interrupted sounds.

It is also an object of the present invention to provide methods and apparatus to test tone signals and detect malfunctions therein by initiation commands from a central control (the CPU); so that some or all of the tone signals may be checked when, and as often as, it is desired.

Another object is to monitor any of a large plurality of tone generator tones by common test apparatus by the efficient procedure of routing any of the tones through a connection set up in a switching network, to the input of a single error detector device.

A specific object of the invention is to provide a common, simple test for monitoring any one of a large plurality of tones, regardless of its characteristics, but which by itself might make the test results inaccurate for interrupted tones, while providing a second common test procedure to remove that possible inaccuracy without detracting from the reliability of tests on continuous tones.

Yet another object of the invention is to provide methods and apparatus for detecting malfunctions or errors in tone generators or tone signals and further to produce signals which will indicate when the procedures or the detecting apparatus are themselves faulty.

These and other objects and advantages will become apparent as the following description proceeds in conjunction with the accompanying drawings, in which FIG. 1 is a generalized block diagram of a PCM time multiplex communication system which serves as an example of an environment in which the present invention finds advantageous application;

FIG. 3 is a table showing the significance of certain signals produced in the course of monitoring or testing tone signals.

While the invention has been shown and will be described in connection with certain embodiments presently considered to be preferred, there is no intent to limit it to those embodiments. On the contrary, the intent is to cover all alternatives, modifications, and equivalents included within the spirit and scope of the invention as defined by the appended claims.

Figure 1:
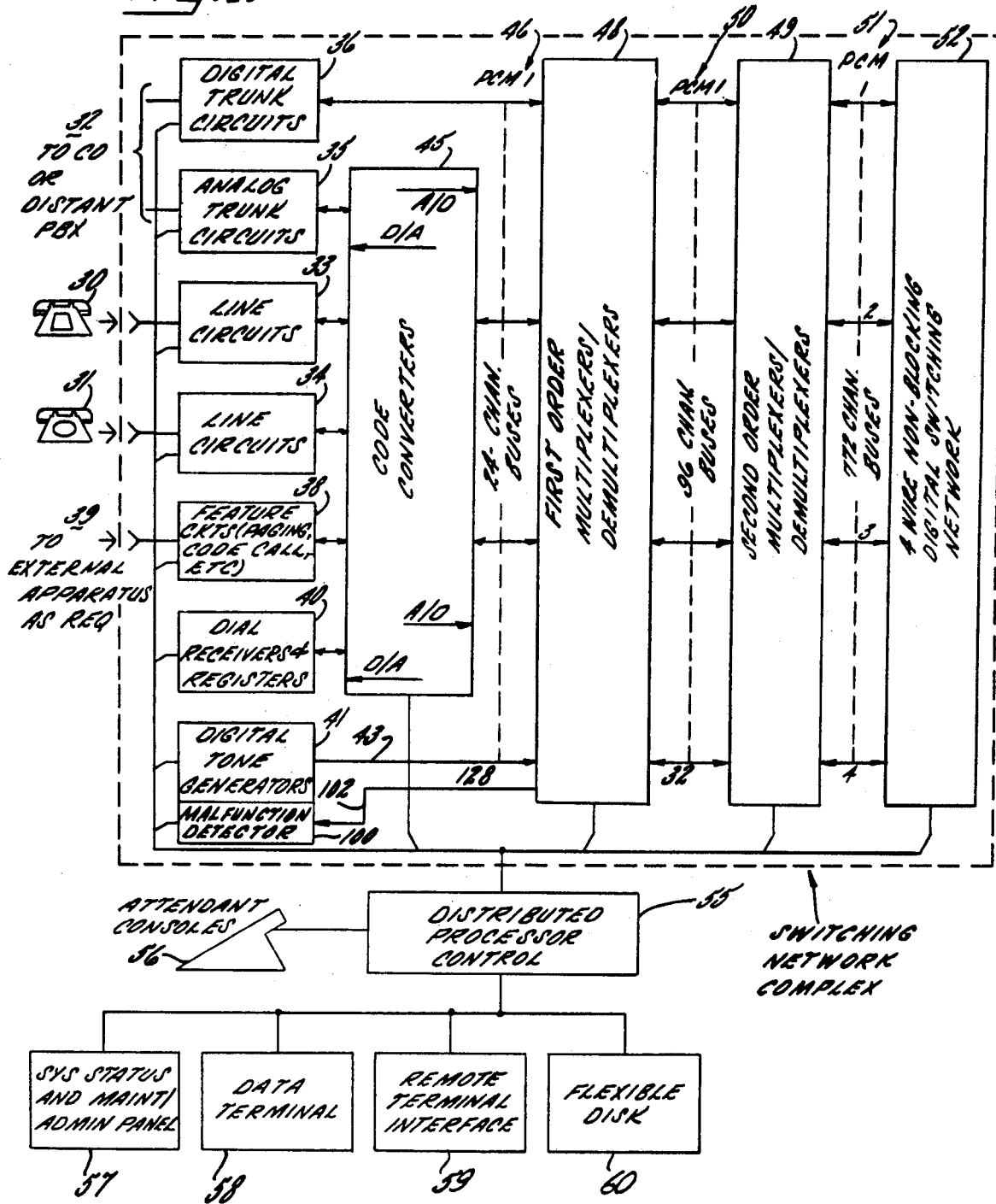

Referring now to FIG. 1, there is shown an overall block diagram of a telecommunications switching system intended to serve as an illustrative environment for the tone generator malfunction test of the present invention. The switching system is adapted for connection to a plurality of lines represented by telephone instruments 30, 31, and also to a plurality of trunks generally indicated at 32. The general term access ports will be used herein to denote these and other system input terminals. Circuitry is provided to interface the lines and trunks to the switching system, such circuitry being represented by line circuits 33, 34, analog trunk circuits 35 and digital trunk circuits 36. Because the switching system is of the four wire variety, the line circuits 33, 34 and the analog trunk circuits 35 include hybrids for converting the two wire line signals to four wire for use by the switching system. The digital trunk circuits 36 are not necessary in the practice of the invention, but are shown for sake of completeness. Such circuits are intended to directly interface a T1 digital line to the switching system without the need for code conversion of any sort.

In addition to establishing and maintaining "standard call" connections between lines and trunks, the system is capable of providing additional features where desired. The apparatus for effecting such features is represented by element 38. For example, the system may be configured to carry out, as optional functions, paging, code call, multi-port conferences and the like. Additional apparatus as required, for example audio equipment for use with the paging feature, is indicated generally at 39.

Means are provided for receiving and storing dialed digits for use by the control complex in establishing connections between the lines and trunks as required. Such equipment, generally indicated at 40, may include both dial pule receivers and DTMF receivers, the general term dial receivers being used to encompass both. In addition, the equipment includes registers for storing the digits as they are received.

As noted above, the switching system is configured as a four wire digital system, and therefore requires conversion between the analog information on the trunks and lines to a digital format. To that end, a plurality of code converters having A/D sections and D/A sections are provided indicated generally at 45. In the preferred embodiment the digital code utilized is compatible with North American Industry standards, utilizing an eight-bit format, a 1.544 megabit transmission rate and compression with $\mu$ equal to 255. The code converter block 45 is comprised of a plurality of T1 PCM code converters, each capable of sampling 24 discrete channel lines and converting analog data samples to digital data samples in the direction toward the network. Each code converter also converts digital data samples to analog data samples in the direction toward the lines and trunks and distributes the analog samples to the proper discrete channel line. A practical embodiment of the illustrated switching system can handle a maximum capacity of 3088 channels, 3072 active channels and 16 lost to framing. Such a system would require approximately 128 code converters, each capable of handling twenty-four channels, thereby providing at the output of the code converters 45 a plurality of PCM buses 46, each carrying bidirectional information for 24 channels. In the 3088 channel system, there are approximately 32 of such buses resulting from tying four code converter outputs to each bus. Each bus is in turn implemented as a pair of oppositely directed unidirectional, nine-wire cables for carrying nine parallel bits of time sequenced words, each word having eight data bits and a ninth signaling bit.

In order to properly route the digital data samples from the code converters to the network for efficient switching, and from the network back to the code converters for distribution to the lines, a pair of multiplexers are provided, indicated as first order or low level multiplexer/demultiplexer 48 and second order or high level multiplexer/demultiplexer 49. Each low level multiplex section of multiplexer/demultiplexer 48 receives 96 channels of time sequenced parallel bit information from four 24-channel code converters on 32 buses 46 and multiplexes each parallel bit information into serial bit information for 96 channels. The low level demultiplex section demultiplexes the signals flowing in the opposite direction. The high level multiplex section of multiplexer/demultiplexer 49 receives the serial bit information on the 32 incoming buses 50, converts it to ten-bit parallel form (eight data bits, a signaling bit and a parity bit) and arranges it on four parallel ten-wire buses 51 each carrying information for 772 channels. The high level demultiplex section performs the complementary function in the opposite direction using a second ten-wire bus 51. The four 772 channel buses are connected to the four wire non-blocking digital switching network 52 which serves to switch in time information from selected channels for the purpose of completing connections between those channels.

The configuration of the digital switching network itself is known, being explained, for example, in "A Review of Telecommunications Switching Concepts-Part 1" and Part 2 thereof, published in *Telecommunications* February 1976 and March 1976, respectively. Suffice it to say that the network, or each block thereof includes an information memory having individually addressable locations for each channel in the system. Information received and processed through the code converters is multiplexed onto the appropriate buses where each channel occupies a dedicated time slot. This information is sequentially written into dedicated memory locations, with all samples being updated each 125 microseconds. For the purpose of making connections, the network, or each block thereof includes one or preferably two connection memories, each having an addressable location dedicated to each channel in the system. A connection is established by writing "paired numbers" into the connection memory. The address of the first line is written at the location assigned to the second line, and vice-versa to "connect" the first and second lines. Thereafter, during the time slot for the first channel, the information memory is written with the data from that channel, and also data is read out of the information memory at the address established by the connection memory, threby placing the sample from the second channel into the time slot for the first channel for return to the first channel. Subsequently, during the occurrence of the time slot for the second channel a similar operation takes place with the result being that samples from the two channels are swapped in time causing the first channel to receive samples from the second channel and vice versa. In short, a communication path is established.

In order to accommodate efficiently the 3072 channels, the network is preferably broken into four blocks. Each block writes information to only one-fourth of the total number of channels, that is, 772 channels. However, to provide full availability, information from each channel is written into each of the four blocks.

The interaction between the elements of the system described thus far is under the control of the distributed processor control complex 55. Stated generally, the control complex detects requests for service from lines, trunks and the like, determines available class of service for those elements and completes connections in the network. To that end the distributed processor control complex 55 has circuit connections to the line circuits 33, 34, and specifically to sense points thereof for detecting the on-hook or off-hook condition of the lines and changes between such conditions. Circuit connections are also provided to control points on the line circuits and can be used, for example, to initiate or terminate ringing to selected lines, to set attenuators in the transmission path or the like. The complex 55 also has circuit connections to the trunks, and specifically to the sense points for detecting the conditions thereof and to control points for controlling the trunks. Similar connections are provided to the feature circuits 38. Circuit connections between the control complex and the dial receivers and registers 40 are used to cause those receivers to collect dialed digits and to receive the collected digits for the purpose of completing connections. The complex 55 also has circuit connections to digital tone generators 41 the code converters 45 and the multiplexers/demultiplexers 48 and 49 for exercising appropriate control over those elements. Connections are also provided between the complex 55 and the network 52 for allowing the complex to write addresses into the connection memories for the purpose of establishing connections between the access ports.

In order to inform a user of the response of the system to his request, progress tones are required, such tones in the instant embodiment being produced by a plurality of digital tone generators 41 or a composite tone source of the genus disclosed in the above-identified Mehta et al. application. The tones produced by such generators include dial tone, ring back, busy tone and the like. In addition, maintenance tones such as DTMF tones and other tones are also produced by tone generators 41. Tone generators 41 may, in a practical system, include as many as 18 separate tone generators. The tones generated may be continuous (e.g., dial tones, DTMF) or interrupted (e.g., busy, ring back). While analog tone generators may be utilized, the digital tone generators 41 of the instant embodiment eliminate the need for code conversion, and their successive PCM words are fed directly to the multiplexers 48 as in-going signals in preselected channels to the network 52.

The present invention provides a tone generator malfunction detector 100 which receives tone signals from the tone generators via the switching network 52, and thereby provides a convenient means for testing the tone generators for malfunctions.

The control complex initiates a tone malfunction test and senses the results signaled by the detector 100. In that regard the control complex first controls the network 52 to set up a connection between an in-going channel carrying one of the several tone signals and an output channel feeding back to the input of the malfunction detector 100. The CPU then records and interprets the results from the tone generator malfunction detector.

Additionally, the system makes provision for attendant consoles 56 which typically include an array of indicators or readouts for informing an attendant of system conditions, combined with an array of pushbuttons for allowing the attendant to cause the system to perform specific functions.

Finally, for the sake of completeness, additional elements are shown connected to the distributed processor complex 55, including a system status and maintenance administration panel 57, generally located in the equipment frame for informing a craftsperson of the operational status of the equipment. A data terminal 58 provides a port for entry of information into the system, such as for changing number assignments, and for readout of information or the like. A remote terminal interface 59 allows the control complex 55 to be accessed from a remote location for the purpose of trouble-shooting or updating of the program. Finally, a flexible disc playback unit 60 containing the operating program for the system is actuated to initially load the program, and may be automatically actuated to reload the program in the event of a major system failure.

In summary, each line circuit (the illustrative 3088 channel system here to be treated provides up to 2400), each trunk circuit (the system provides up to 576) and each register (the system provides for 64) occupies a dedicated channel on one of the code converters within converter module 45. Assuming, merely by way of example, that eighteen tones are made available from the generator 41, some may be treated as fixed tones always present in dedicated in-going channels and other may be selectively switched into different ones of twenty-four channels under commands from the CPU 55. All such channels are multiplexed through multiplexers/demultiplexers 48 and 49 such that ultimately each line, trunk, register or tone occupies a dedicated time slot on one of the 772 channel network buses. During a simplified call processing routine, the control complex 55 detects a subscriber off-hook condition while scanning the array of line circuit sense points. Upon detection of the off-hook, the processor immediately connects via the network a dial tone to the call-originating line and sets up a network connection to a register for receiving dialed digits. When all dialed digits are received, the called line is rung, with a ringback tone being connected to the calling line. When the called line goes off-hook, the CPU 55 ultimately established network-through-connections by writing corresponding addresses into the connection memories in the network. The PCM encoded samples received from the lines, trunks, or the like are exchanged between called and calling subscribers every 125 miroseconds. After the network-through-connection is established by the processor, the network information memories accept the PCM encoded samples from subscriber A during subscriber A's dedicated time slot and output subscriber B's previously stored sample. The subscriber A sample is stored until the occurrence of the subscriber B time slot whereupon it is read out while a new sample is stored for subscriber B. This swapping operation continues independently of the control complex 55 until a call termination or other action is sensed whereupon the connection may be cancelled or altered via a further writing of addresses into the network connection memories.

With continuing reference to FIG. 1, the digital tone generators 41 are here assumed to include individual tone generators, each generating a digital tone consisting of a continuously repeating sequence of 8-bit tone words taken one word per frame. Those strings of PCM words are time multiplexed for transmission on twenty-four predetermined transmit channels of a 24 channel bus 43 to the low level multiplexer 48; some of those twenty-four channels have desired tones switched into them by command signals from the CPU. The 24 channel bus 43 from the tone generators 41 is combined with the outputs from the A/D sections of three code converters 45 at bus structure 46, the input to the low level multiplexer 48. Each tone signal, formed by a repeating string of 8-bit words, is transmitted by the low level multiplexers 48 to the switching network 52 where each 8-bit word of a tone is stored in a unique information memory location of the switching network just as if it were one PCM sample derived by PAM sampling in an analog voice channel.

In normal operation the switching network writes the 8-bit tone words stored in the unique memory locations into other locations in the switching memory so that the digital tones are connected in output channels to access ports and thus telephone instruments by means of the switching network. In that way, a single digital tone from a single tone generator, such as a dial tone, can be connected as outputs to a multiplicity of access ports as required. It should also be kept in mind that the digital tone generators are transmit-only devices in that they do not receive back a swapped digital sample originating as an input from any of the access ports such as a telephone set.

In order to test the tone signals and the apparatus which generates them, for malfunctions, one or more malfunction detectors 100 (FIG. 1) are provided as receive-only devices for receiving and testing the digital tones. The malfunction detectors 100 receive the digital tones from the switching network by means of an "in time" connection made in the switching network under the commands of the CPU. Each malfunction detector 100 may be assigned a receive channel which are vacant and available because the tone generators do not require receive channels which are counterparts of their sending channels. In order to carry out a tone generator malfunction test, the switching network, is commanded by the CPU, "puts up a connection" from the input channel carrying the digital tone to be tested to the vacant channel assigned to one of the malfunction detectors 100. After one tone has been tested then the next tone to be tested is connected to one of the malfunction detectors, and so on until all generated tones have been tested.

It should be recalled there are two distinct kinds of tones generated in the system. First, there are continuous tones such as a dial tone or a DTMF tone. The second kind are interrupted tones such as a busy signal or a ring back signal which might be, for example, one-half second of a given sound "on" followed by one-half second "off"—the later interval being occupied by the input words being blocked, i.e., converted to the zero or quiet level of the PCM code. The CPU has stored in its memory for each of the eighteen tones which of the tones are continuous, which of the tones are interrupted and what the duration of the "off" period is for each of the interrupted tones.

In accordance with the present invention, any tone to be tested, regardless of its kind, is tested to determine and signal if it is "stuck-at-dc.". This is done by comparing the successive 8-bit words of that tone, appearing in a predetermined number of frames, to determine if they are all alike. In the exemplary embodiment here to be described the comparing takes place over four frames (a time interval of 500 microseconds). If any tone signal is found not to be "stuck-at-dc." its successive PCM words are properly exhibiting values which change from frame-to-frame, and the tone is "good" (unless the malfunction detector itself is defective).

If, however, a tone being tested is of the interrupted kind and the stuck-at-dc. test is made during an "off" interval of the tone, then a "stuck-at-dc." signal will result even though the tone generator is functioning properly. In accordance with the invention a second "idle tone test" is made by comparing the successive tone words, appearing in the same predetermined number of frames as those for the first test, with the "zero" or "quiet" value of the PCM code—and producing an "idle signal" if all such words are in fact "quiet" values. This does not destroy the validity of a "good" result if any tone is found not to be stuck-at-dc. (unless the malfunction detector is itself faulty); but it enables interrupted tones to be found "good" only if the stuck-at-dc. and the "idle" signals are both absent. In the event that the "stuck-at-dc." and "idle tone" signals both appear, the testing is repeated over and over for an extended period longer than the "off" interval of an interrupted tone. If during such extended period and successive tests, both stuck-at-dc. and idle signals are simultaneously absent, the tone is known to be "good"; and if the latter appears in the absence of the former, it is known that the malfunction detector is faulty. A single "two-test" malfunction detector device therefore serves to provide indications that any tone (whether continuous or interrupted) is "good" or "bad"; and in addition it further provides an indication if the detector itself is faulty.

Turning to FIG. 3, a table is provided which shows the interpretation for the result signals from the two tests. The interpretation of the test is done by the CPU in conformity with the table of FIG. 3. SDD is an acronym for sutck-at-dc. detect (stuck at a fixed value which may include zero or quiet). ITD is an acronym for idle tone detect (all tone words are at zero level). A "1" in FIG. 3 for SDD indicates that the tone being received is stuck at a dc. level, i.e., it did not change in value for the duration of a first time interval (e.g., four frames). A "1" in FIG. 3 result signal ITD indicates that the tone is off or idle during that first time interval.

Starting from the bottom of the table of FIG. 3, SDD is "0" and ITD is "0". The CPU would determine from that result that the tone being tested is not stuck at a dc. level for the first time interval nor is the tone stuck at an off condition. Therefore, the CPU interprets the test result to be that the tone word is good because it is changing.

The combination when SDD is "0" and ITD is "1" indicates that the tone is not stuck at a dc. level (SDD is "0"), but it is stuck at off (ITD is "1"). Because a tone cannot be changing over the four frame interval (SDD is "0") and at the same time be stuck at off (ITD is "1"), the CPU determines from this result signal combination that the tone malfunction detector 100 has itself failed.

IF SDD equals "1" and ITD equals "0", the interpretation is that the tone is stuck at a fixed dc. level (SDD is "1") and that dc. level is not the zero or quiet level (which would occur if the tone were of the interrupted kind and in one of its "off"intervals). Therefore, the CPU interprets that condition to be an error condition, the tone is stuck at some value other than an interrupted tone's zero level.

Finally for the combination SDD equals "1" and ITD equals "1", the tone is stuck at a dc. level (SDD is "1") and that level is an off condition (ITD is "1"). Because the interval (four frames or 500 microseconds) during which the two tests are made is less than the "off" period of any interrupted tone, it may be that the sample was taken during the interrupted (off time) of an interrupted tone signal which is being generated properly. As a result, the CPU causes both malfunction tests (four tone words tested for SDD and ITD) to be repeated over and over during a second, longer time interval which is greater than the longest "off" period of any interrupted tone to determine if, during the second time interval, SDD and ITD will both become "0" indicating that the tone is changing (SDD="0") and it is not stuck at off (ITD="0"). If during such repetition of the tests the result of SDD=1 and ITD=0 is obtained, it is known that the interrupted tone is stuck-at-dc. during its "on" periods; but if the result of SDD=1 and ITD=1 is always obtained, it is known that the tone (whether continuous or interrupted) is permanently stuck at zero.

Figure 2:
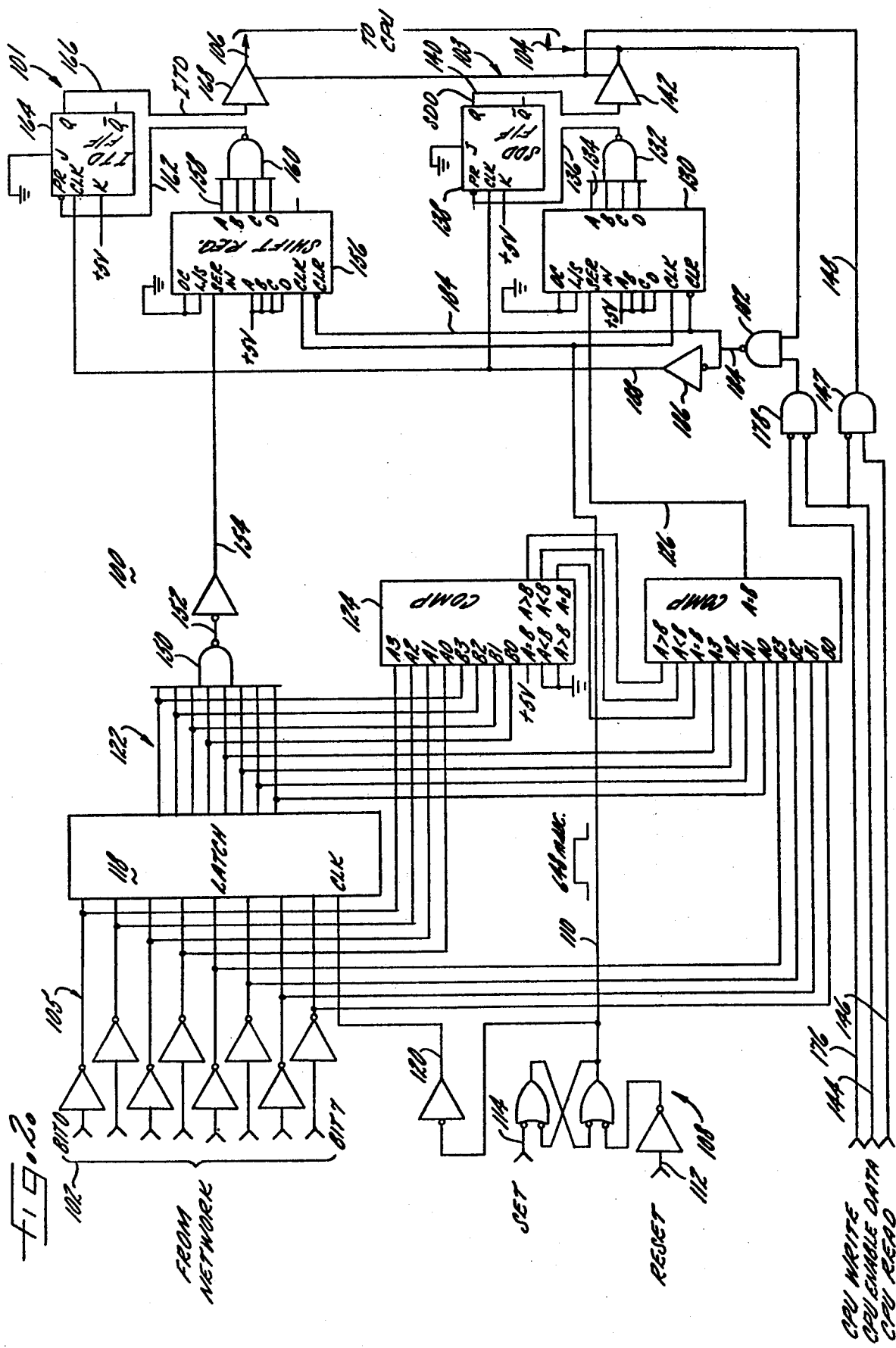
FIG. 2 is a detailed block diagram of apparatus which embodies and which carries out the method of the present invention.

Turning to FIG. 2, an illustrative embodiment of a tone generator malfunction detector is disclosed, which is capable of making two tests and providing both an SDD signal and an ITD signal as described above for interpretation by the CPU.

Turning to FIG. 2, the tone generator malfunction detector 100 receives successive samples (8-bit tone words) of the tone being tested from the network on digital inputs 102 from bus 46. The tone words are received in 8-bit parallel format in one preselected channel of the 24 time multiplex channels connected to inputs 102. Each channel received at inputs 102 has a 5.2 microsecond channel time (125 microseconds divided by 24), and any one of the large plurality of tones available from the tone generators 41 may be "connected" in the network 52, upon command signals from the CPU 55, to appear in the preselected network output channel to which the detector 100 responds. The malfunction detector has an idle tone detector (ITD) 101 and a stuck-at-dc. detector (SDD) 103. The detector 100 responds to tone signals in preselected channel of the twenty-four channel times at inputs 102, and checks the tone words for four frames (500 microseconds) by means of the stuck-at-dc. detector 103, and the idle tone detector 101. These respectively produce the result signals SDD and ITD on output lines 104 and 106, respectively, which may then be "read" or sensed by the CPU.

The tone generator malfunction detector 100, in the specific example of FIG. 2, is configured to respond to channel 0 as the preselected channel. Channel 0 is accepted under the control of a channel select circuit 108 which produces a positive-going strobe pulse, 648 nanoseconds wide, on line 110 only during the first of twenty-four channel times within a 125µ sec. frame. The positive-going strobe pulse on line 110 is produced by the leading edge of a reset pulse on line 112 followed 648 nanoseconds later by the leading edge of a set pulse on line 114. The reset and set pulses on lines 112 and 114 respectively are generated in the low level multiplexer 48 which establishes the timing between the transmitting of time multiplexed channels to the switching network and their reception at the low level multiplexer from the switching network. In that way the reset and set pulse can be timed so that they correspond to a particular receive channel coming back from the switching network—in this case channel 0. By using a different set of reset and set pulses from the low level multiplexer card, any one of channels 0 through 23 could be alternatively preselected for the malfunction detector if desired.

The strobe pulse for channel 0 on line 110 passes through an inverter 116 to the "clock" terminal of a "previous sample" latch 118. The latch 118 is an octal, D-type flip-flop such as an SN74LS273, manufactured by Texas Instruments, Dallas, Tex. The data inputs 105 to previous sample latch 118 are the inverted bits of an 8-bit tone word from inputs 102.

The channel time allotted for receiving one channel at inputs 102 is 5.2 microseconds. The data is stable at the inputs 105 of the previous sample latch at the leading edge of the 648 nanosecond strobe pulse on line 120. 648 nanoseconds later the trailing edge (positive-going) of the strobe pulse stores the input data on lines 105 of the latch 118, such data then appearing at the outputs 122 until new data is clocked in at the end of channel 0 in the next succeeding frame. During this 648 nanosecond channel 0 time, which is the width of the strobe pulse during the next succeeding frame, the malfunction detector processes the tone word of such frame as described below.

In order to perform the first or stuck-at-dc. test, the outputs of previous sample latch 118 on lines 122 (the previous frame tone word) are connected to one set of inputs of comparators 124 and 126 during the 648 nanosecond test time. Also, the input signals at 105, which represent the tone word for "this frame" or the present channel 0, are connected to the other set of inputs of comparators 124 and 126. The comparators may be, for example, standard 4 bit comparators such as SN74LS85, manufactured by Texas Instruments, Dallas, Tex. The comparison result of comparators 124 and 126 on line 128 is a "1" if the tone word sample of the previous frame held on output lines 122 is equal to the tone word sample of the present frame on lines 105. Otherwise line 128 is a "0" if the two samples are not equal.

The comparison result on line 128 from comparator 126 is connected to a four bit shift register 130 (for example, a standard 4 bit shift register such as SN74LS395, manufactured by Texas Instruments, Dallas, Tex. It serves as a comparison result storage means for holding the comparison result of each of four comparisons made during a four frame time interval. The comparison result on line 128 is shifted through four stages so that the results for four frames appear at the outputs 134 of register 130. Each shift occurs in response to the falling, trailing edge of the strobe pulse on line 110 which is applied to the "clock" input of shift register 130. After the tone words in four frames have been compared (during a four-frame first test time interval), the outputs 134 of shift register 130 will all be 1's if all four tone words have been alike. In that case, a NAND gate 132 will produce a "0" signal on line 136. The NAND gate 132 in this embodiment is a comparator used in the stuck-at-dc. detector to indicate the results of a four frame comparison.

A "0" or a "1" on line 136 signifies that the tone is or is not stuck-at-dc. It is applied to the preset input of an SDD flip-flop 138 which is a J-K flip-flop serving as an SDD holding means. The "0" on preset input 136 drives flip-flop 138 to a set state and produces a "1" on the Q output 140. The "1" on the Q output 140 of flip-flop 138 is the SDD result signal tabulated in FIG. 3 and indicates that the tone sample did not change over the four frame first test time interval (500 microseconds) for which the test was run. Thus, the presence or absence of a "1" level on line 140 signifies the tone being tested is or is not stuck-at-dc. The state of result signal SDD on line 140 is communicated to the CPU via gated driver 142 and output line 104. Driver 142 is activated by a "0" level data enable signal on line 144 and "1" level CPU read signal on line 146 which come from the CPU and together cause a gate 147 to produce a "1" on line 147 to activate driver 142.

During the same four frame test time interval, the outputs 122 of the previous sample latch 118 are also processed by idle tone detector 101 which includes a zero level detector 150. If an interrupted tone is in its "off" interval (or if any tone is stuck at zero) the latch outputs at 122 are all "1's" (recalling that the inputs at 102 were inverted) so that zero level output of zero level detector 150, here formed by a NAND gate, is a "0" on line 152. A "0" on line 152 is inverted to a "1" on line 154 and connected to 4 bit shift register 156 (a Texas Instruments SN74LS395) serving as a means for storing a "1" when each of four successive tone words, during the four frame test time interval, has a zero or quiet value. The output from the zero level detector 150 on line 154 is shifted into register 156 at the end of each 648 nanosecond test time by the trailing edge (negative going) of the strobe pulse on line 110.

If, for example, the successive words of the tone being tested remain at a zero level (corresponding to an idle tone condition) for the four frames of the test, four "1's" appear at the outputs 158 of shift register 156. In that case, and only in that case, a NAND gate 160, which is a time interval comparator for the idle tone detector, produces a "0" on line 162. A "0" or a "1" on line 162 signifies that the tone being received is or is not "idle". It is applied to the preset input of an ITD flip-flop 164 similar to the flip-flop 138. The "0" on preset input 162 of ITD flip-flop 164 produces a "1" at the Q output, line 166, which is the ITD output tabulated in FIG. 3. Thus, the presence or absence of a "1" level on line 166 signifies that four successive words of the tone being tested have had a constant zero level for the four frames (500 microseconds) and therefore that the tone is "idle". That information on ITD output line 166 is transmitted to the CPU on line 106 by means of driver 168 which is activated via conductor 148 by a "1" level read pulse on line 146 and a "0" level data enable pulse on line 144 from the CPU.

The tone generator malfunction test is initiated by the CPU putting coinciding 0 level pulses on enable data line 144 and write line 176. That combination causes a gate 178 to produce a "1" level pulse on line 180. The CPU also, coincident with the "1" on line 180, sends a "1" level signal to SDD output 140 line which is connected to a NAND gate 182. The latter then produces a "0" level on line 184, causing an inverter 186 to produce a "1" level on line 188. A "1" pulse at line 184 is, in effect, a "start the test" signal.

Line 188 is connected to the clock inputs of the ITD and SDD flip-flops 138 and 164. Since the K control terminals of the latter are tied to a "1" level (+5 volts), both flip-flops are reset (to make their Q outputs="0") on the trailing edge (negative-going) of the positive pulse on line 188. The negative pulse on line 184 is connected to the "clear" inputs of the ITD and SDD four bit shift registers and clears them to hold all O's when a four frame test is initiated.

Therefore as soon as the pulses on line 188 and 184 terminate, as controlled by the CPU, the malfunction detector has been initialized in preparation for receiving the first sample of the tone to be tested.

Anytime after at least four frames have elapsed, the CPU sends a "1" on read line 146 and a "0" on enable data line 144 to enable drivers 142 and 168 in order to read the result signals SDD and ITD from lines 140 and 166. A four-frame delay is sufficient, but if a greater number of frames are permitted to elapse before the results are read, "1" levels for result signals SDD and ITD reflect the fact that in any consecutive four of such frames the tone words were (i) stuck-at-dc. and (ii) stuck-at-zero.

For the combinations 0, 0 and 1, 0 of ITD and SDD (see FIG. 3), the CPU immediately can confirm after four frames that the tone signals being tested are good or bad, respectively. If the result signals appear as 0, 1 (ITD present the SDD absent), the CPU may immediately interpret this as indicating some fault in the malfunction detector because no tone can, under any conditions, have its successive words both changing from frame-to-frame (not stuck-at-dc.) and stuck-at-zero. For the 1, 1 combination of ITD and SDD, the CPU decodes the result signals as indicating that the tone being tested was at a zero level and not changing for the four frames sampled. The 1, 1 combination requires further monitoring to determine if the tone was merely at the zero level during the interrupted portion of a good interrupted tone or permanently stuck at the zero level because the tone generator being tested is simply not working properly. Accordingly, the CPU is programmed to respond to the 1, 1 combination for ITD and SDD by initiating successive repeats of the four-frame test during a second time interval which is longer than the longest "off" period for the interrupted tones. If ITD and SDD remain at 1, 1 values during all such four-frame test repetitions within that second time interval, then the CPU interprets such a result as indicating the tone words to be permanently stuck-at-zero and therefore that the tone generator (whether for a continuous or interrupted tone) is malfunctioning. But if during any such repetition of the four-frame dual test, an SDD, ITD result other than 1, 1 is received, it is treated as having the significance indicated above. Thus, if an interrupted tone is stuck-at-dc. during its "on" periods, that malfunction will be found. Of course, after some result (one of four possibilities described) has been found and logged in the CPU (optionally with a display or alarm) then the CPU can command the network 52 to connect a different one of the several tones to channel 0 at the input of the detector 100; and the CPU can initiate a four-frame dual test by that detector. In this way, all of the many tones may be checked in succession—and technicians can cure the faults as and if indicated by the CPU.

Those skilled in the art will know readily how to set up a CPU (central computer control) to establish network connections from the tone generators to the malfunction detector, to initiate a four-frame test sequence in the detector, to read and decode the result signals SDD and ITD, and to initiate repeated tests in the event any result turns out with the 1, 1 combination. The teachings here given are entirely adequate in that regard.

Figure 4:
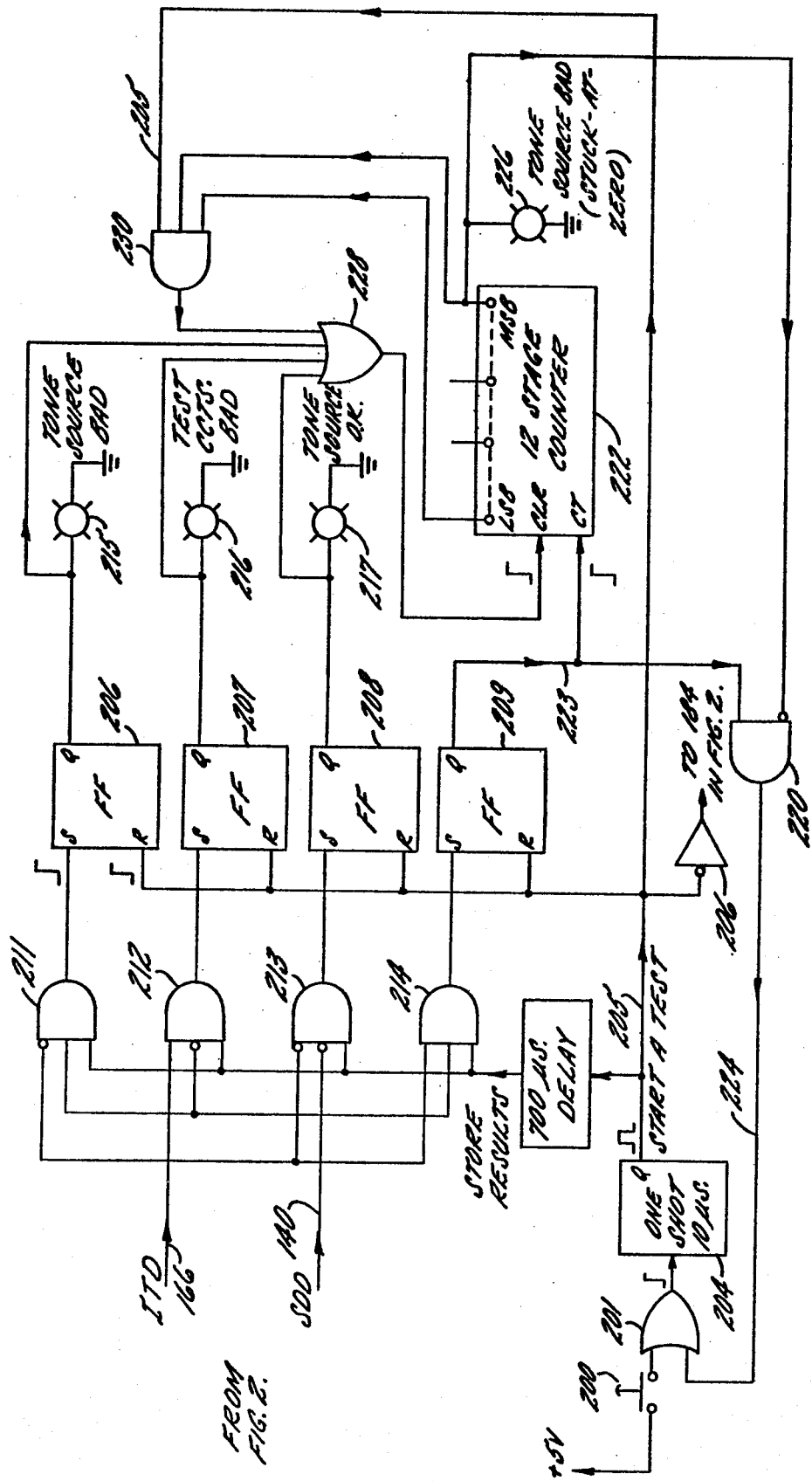
FIG. 4 is a block diagram of apparatus, as an alternative, may be utilized to respond to the output signals produced in the apparatus of FIG. 2.

To further illustrate the practice of the invention, however, FIG. 4 shows apparatus which may be desirable in some applications for responding directly to the two-test result signals SDD, ITD in order to provide a direct readout on indicator lamps or audible alarms of the condition found when any tone is tested. The leads 166 and 140 in FIG. 4 connect to the corresponding leads in FIG. 2, it being assumed that the drivers 142, 168 and the gates 147, 178, 182 in FIG. 2 are omitted.

In the apparatus formed jointly by FIGS. 2 and 4, a two-test sequence on a given tone is initiated by momentary closure of a switch 200 coupled through an OR circuit 201 to the trigger input of a one-shot (monostable multivibrator) circuit 204. Assuming that the network has been conditioned to send signals for a given tone in channel 0 to the input terminals 102 of the malfunction detector 100 (FIG. 2), momentary closure of switch 200 (FIG. 4) results in the one-shot circuit 204 producing a short "1" level pulse of about ten microseconds on a conductor 205. That pulse may be viewed as a "start test" signal which passes through an inverter 206 in reaching the conductor 184 (FIG. 2) to cause clearing of shift registers 130, 156 and flip-flops 132, 164. That same "start test" pulse is applied via conductor 205 to the reset terminals of four storage flip-flops 206-209 (of the set/reset type responsive to positive-going wavefronts) thereby assuring that all four are placed in their reset states (with their Q output terminal at "0" levels).

Once a test has been so initiated, the apparatus of FIG. 2 carries out the two tests previously described over the span of the following four or more frames occupying 500 or more microseconds—previously described. Thus, regardless of the point in time at which a "start test" pulse appears, the operations for the two tests will have been completed, and the results represented by the presence or absence of the signals SDD and ITD, within less than 700 microseconds. The apparatus of FIG. 4 provides for automatic decoding and storage of the results of any test which is initiated by a "start pulse" on line 205. For this purpose, the "start pulse" on line 205 is passed through a delay circuit 210 chosen to produce a delay of about 700 microseconds. The delayed output pulse on conductor 148' will pass through one of four decoding gates 211-214. One of those four gates is enabled when a corresponding one of the four possible combinations of the result signals SDD and ITD exists. It will be apparent from the inversion symbols at the inputs of the four gates 211-214 that the delayed pulse appearing on the line 148' passes the gate 211 to set the flip-flop 206 if SDD is present and ITD is absent (the 1, 0 combination). The delayed pulse at 148' passes through the gate 212 to set the flip-flop 207 if the SDD signal is absent but the ITD signal is present (the 0, 1 combination). Similarly, the delayed pulse at 148' passes the gate 213 to set the flip-flop 208 if both result signals SDD and ITD are absent (the 0, 0 combination); and it passes the gate 214 to set the flip-flop 209 if both result signals are present (the 1, 1 combination). Thus, when a test on a given tone is initiated, the four storage flip-flops 206-209 are first reset at the time the test operations in the circuits of FIG. 2 begin, and 700 microseconds later one of the four flip-flops 206-209 is set to uniquely represent and signal the results of the test.

The flip-flops 206, 207, 208 are connected to excite suitable indicators here shown respectively as lamps 215, 216, 217. Thus, if flip-flop 206 is set and the lamp 215 is illuminated, a human operator will be apprised immediately that the tone source, or the given tone signals, being tested is bad. Likewise, if the lamp 216 is illuminated because the flip-flop 207 has been set, a human operator will be apprised that the test circuitry itself is malfunctioning because a 0, 1 combination of the result signals SDD and ITD has been obtained. If the lamp 217 is illuminated because the flip-flop 208 has been set, a human operator is informed that the tone source producing the given tone under-test is functioning properly. If one of the lamps 215-217 turns on, the test is complete; a new test on the same or a different tone may be initiated by closure of the switch 200.

In accordance with one aspect of the invention, however, if the result signals SDD and ITD turn out to have a 1, 1 combination, the testing of a given tone is repeated over a longer, second interval of time. The apparatus of FIG. 4 causes such repetitions to occur automatically for a second interval of time which is at least as long as the longest "off" interval of an interrupted tone. For this purpose, the Q output terminal of the flip-flop 209 (which rises to a logic 1 level if a single two-part test causes the 1, 1 result combination) is connected via a conductor 223 to the input of a normally-enabled gate 220 and to the "count" terminal of a twelve binary stage counter 222. Thus, when the conductor 223 rises to a 1 level, a positive-going wavefront appears at the output 224 of the gate 220, the latter being enabled by a 0 level signal at the most significant bit (MSB) output terminal of the counter 222. The rising edge of the pulse at line 224 passes through the OR circuit 201 to trigger the one-shot circuit 204 and thus produce a "start pulse" on line 205. A second two-part test is thus initiated and the sequence of operations previously described is repeated. That is, the flip-flop 209 is reset (as are the shift registers 130-156 and the flip-flops 142, 164 in FIG. 2); and after digital tone words have been received in four or more frames during a 700 microsecond delay interval, the results of a second test operation are stored in one of the flip-flops 206–209.

Each time the flip-flop 209 is set (and this may occur as a great number of successive test produce the 1, 1 result combination), the rising edge of the pulse which appears on line 223 causes the counter 222 to register one count. That counter is employed as a timing device to measure off the second time interval which is longer than the longest "off" interval of any interrupted tone. Because the counter is formed by twelve tandem flip-flops or binary stages, it must receive and count 2048 pulses before its MSB output terminal rises to a logic 1 level. Thus, if the successive repetitions of the two-part test all result in the SDD and ITD signals having the 1, 1 combination and the successive setting of the flip-flop 209, there will be a total of 2048 tests in the iteration sequence, requiring 1.43 seconds (at 700 microseconds per test repetition) before the MSB output terminal of the counter 222 rises to a logic 1 level. The 1.43 seconds is here assumed to be greater than the longest "off" interval of any interrupted tone. If the counter reaches a count state of 2048, it is virtually certain that the given tone being tested is stuck-at-zero, i.e., all of its successive words have a zero or quiet value irrespective of whether the tone under test is a continuous tone or an interrupted tone. Thus, if the test iterations result in the MSB output terminal of the counter 222 rising to a 1 level, an indicator here shown as a lamp 226 connected to that terminal is excited so that a human operator may be apprised that the tone being tested is stuck-at-zero.

When the lamp 226 is turned on because the output at terminal MSB rises to a logic 1 level, than the gate 202 is disabled and can no longer pass a "1" level pulse created on line 223 when flip-flop 209 is set. This means that when the flip-flop 209 is set in the last of a series of test iterations to make the counter change from its 2047 to its 2048 state, a logic 1 signal will pass through the gate 220 to line 224 and cause the one-shot 204 to initiate one more test. When that last test again results in the setting of the flip-flop 209, the counter will have reached the 2048 count state, the gate 220 will be disabled, and the rising edge of the signal on line 223 cannot pass the gate 220 to initiate another test sequence. The counter does register the last pulse on line 223 and then freezes in a count state of 2049 (LSB=1, MSB=1) with the lamp 226 turned on.

If, indeed, the initial setting of the flip-flop 209 was caused by sensing successive frame words of an interrupted tone during the latter's "off" interval, and the tone words are appearing correctly during "on" intervals of that tone, the counter 222 will not reach the 2048 count state before it is cleared and restored to the zero count state. This is accomplished by an OR circuit 228 having three inputs respectively connected to the Q terminals of the flip-flops 206–208. As successive tests are repeated and the "off" interval of the tone under-test ends, then one of the flip-flops 206–208 will be set at the conclusion of one of the repeating tests. When that occurs, the OR circuit 228 will pass a rising signal edge to the clear terminal CLR of the counter 222 and reset the latter to its 0 state before it reaches a count state of 2048 and before the lamp 226 is turned on. The condition of the interrupted tone words (which are not stuck at zero) is then indicated by that one of the three lamps 215–217 which is illuminated. Thus, when an interrupted tone is tested and if it is not stuck at zero, the lamps 215–217 indicate whether the successive tone words are stuck-at-dc., whether the test circuits themselves are faulty, or whether the tone words are properly changing from frame-to-frame.

In the event that a given tested tone is stuck-at-zero so that the lamp 226 is illuminated because repeated tests carried out over an interval of 1.43 seconds indicate that all of many tone words have a zero value, then another tone may be brought to the malfunction detector at its input terminals 102 and subjected to testing. All that need be done is to momentarily close the switch 200 in order to initiate testing of the next tone. When the switch 200 is closed at a time when the lamp 226 is lighted because the counter 222 is frozen in a count state of 2049 (the MSB and LSB output signals are both "1"), then an AND gate 230 is enabled and will pass the "start pulse" appearing on line 205 to one input of the OR circuit 228. The latter thus applies a clearing signal to the counter 222, resetting the latter to its zero state and causing the lamp 226 to go out as an incident to initiation of a new test on the same or a different tone. Therefore, after the operator has noted and recorded the fact that a first tone being tested was stuck-at-zero because the lamp 226 turned on when the first tone was tested, a second tone may be tested merely by bringing it in channel 0 to the input terminals 102 (FIG. 2) and again momentarily closing the switch 200.

In summary, the present invention enables monitoring of any of a plurality of tones digitally generated in a PCM time multiplex communication system. The tones may be fed individually in sequence to a single malfunction detector 100 so that each one is found to be good or bad. In the event that the malfunction detector itself is faulty and produces an impossible result signal (combination 0, 1), this fact is also indicated. The monitoring of the tones by a single detector 100 is carried out reliably despite the fact that some of the tones to be tested may be of the continuous kind and others may be of the interrupted kind. Sice a stuck-at-dc. result may be obtained if an interrupted tone is tested when it is in one of its "off" intervals, the apparatus and method of the present invention provide for excluding an indication of a tone fault merely from a finding that the tested tone words are stuck at some dc. level. This exclusion is achieved by testing successive tone words to see if they are all stuck-at-zero, in which case test iterations are carried out over a second time interval which is long enough to be sure that an interrupted tone is examined during one of its "on" intervals. Thus, any tone will not be found bad because it exhibits stuck-at-zero test results unless it is actually so stuck. The CPU referred to in connection with FIG. 2 or the lamp 226 discussed above with reference to FIG. 4 may provide an indication that either a continuous tone or an interrupted tone is erroneously stuck-at-zero if that is the malfunction condition which actually exists, and yet a malfunction will not be indicated for an interrupted tone unless its successive PCM words during its "on" intervals are either stuck at some dc. level (lamp 215) or stuck-at-zero (lamp 226). Thus, the present invention by relatively simple apparatus and methods provides for reliable monitoring of a large plurality of tone generators and tone signals, whether of the continuous or the interrupted kind, to determine if they are good or bad.

We claim:

1. A method of detecting malfunctioning of a digital tone generator in a PCM time multiplex communication system, said system including a network for switching a given tone from a tone generator so that successive digital words of the tone appear in a preselected output channel of successive frames, said method comprising
(a) comparing the successive digital words appearing in a preselected output channel carrying a tone during a plurality of successive frames, and
(b) in response to such comparison indicating that all such successive words are alike, producing a stuck-at-dc. signal (SDD).

2. The method defined in claim 1 further characterized in that the tone being carried in said preselected output channel may be either a continuous tone or an interrupted tone, and further including
(c) monitoring the digital words appearing in said preselected output channel during said plurality of successive frames to produce an idle signal (ITD) if all such words represent quiet values in the PCM code, and
(d) signaling a tone generator malfunction when said SDD signal appears in the absence of said ITD signal.

3. The method defined in claim 2 further including
(e) signaling a tone generator O.K. condition when said SDD and ITD signals are absent after said steps (a) through (c) have been carried out.

4. The method defined in claim 2 further including
(e) signaling an invalid test when said ITD signal appears in the presence of said SDD signal.

5. The method defined in claim 2 further including
(e) repeating said steps (a) through (d) when said SDD and ITD signals appear in the presence of one another.

6. The method defined in claim 5 further characterized in that said repeating is continued until the SDD and ITD signals cease to appear in the presence of one another.

7. The method defined in claim 5 further characterized in that said repeating is continued, so long as each repetition results in the appearance of both the SDD and ITD signals, for a time which is longer than the "off" portion of the on/off intervals of an interrupted tone, and signaling a tone generator malfunction if no repetition during that time results in other than the appearance of both the SDD and ITD signals.

8. The method defined in claim 7 further including signaling a tone generator O.K. condition when, as a result of any repetition, both said SDD and ITD signals fail to appear.

9. The method defined in claim 8 further including signaling an invalid test when, as a result of any repetition, said ITD signal appears in the absence of said SDD signal.

10. In a PCM time division multiplex telecommunications switching system for processing calls and having tone generators for generating continuous tones and interrupted tones having on/off periods, each tone comprising digital tone words appearing in successive frames as inputs to a switching network which, under the control of a computer, can connect any given tone to any of various receive channels for distribution to access ports as progress tones and for maintenance of the switching system, a method for testing a tone generator for malfunction, comprising the steps of:
(a) comparing the tone words of a tone to be tested to each other for a first time interval spanning a plurality of frames and generating a stuck-at-dc. signal in response to all the tone words being the same; and
(b) comparing the tone words of a tone to be tested to a zero level for said first time interval and generating an idle tone signal in response to all the tone words being at the zero level.

11. The method defined in claim 10, further comprising transmitting the stuck-at-dc. signal and the idle tone signal to the computer and interpreting combinations of those signals in order to detect malfunctions.

12. The method set out in claim 10 wherein the step of generating a stuck-at-dc. signal further includes generating a bi-level logic signal having a first state ("1") which indicates that the signal is stuck-at-dc. and a second state ("0") which indicates that the signal is changing, and the step of generating an idle tone signal further includes generating a bi-level logic signal having a first state ("1") which represents an idle tone condition and a second state ("0") which represents a tone other than an idle tone condition.

13. The method set out in claim 11, wherein the step of interpreting includes interpreting the combination for which the stuck-at-dc. signal is a "0" and the idle tone signal is a "0" to be a good tone.

14. The method set out in claim 11, wherein the step of interpreting includes interpreting the combination for which the stuck-at-dc. signal is a "0" and the idle tone signal is a "1" to be a failure of the test method procedure.

15. The method set out in claim 11, wherein the step of interpreting includes interpreting the combination for which the stuck-at-dc. signal is a "1" and the idle tone signal is a "0" to be a tone generator malfunction.

16. The method set out in claim 11 further including (i) detecting when the stuck-at-dc. and idle tone signals both have "1" levels, and (ii) in response to such detection, repeating said steps (a) and (b) over a second time interval which exceeds the off period of any interrupted tone unless the detection is not found during one of the repetitions.

17. In a digital time division, multiplex telecommunications switching system for processing calls and having tone generators for generating continuous tones and interrupted tones having on/off periods, each tone comprising digital tone words appearing in successive frames as inputs to a switching network which, under the control of a computer, can connect any given tone to any of various receive channels for distribution to access ports as progress tones and for maintenance of the switching system, a tone generator malfunction detector for receiving digital words of any given tone to be tested on a receive channel, the malfunction detector comprising:
(a) a stuck-at-dc. detector for determining whether the tone words received during a first time interval fail to change, and for generating a stuck-at-dc. signal for indicating that the tone words failed to change; and
(b) an idle tone detector for determining whether the tone words received during the first time interval all represent an idle tone condition and for generating an idle tone signal for indicating that the tone words all represented the idle tone condition.

18. The malfunction detector of claim 17, wherein the malfunction detector further comprises a receive channel select means for selecting a receive channel used by the malfunction detector for receiving the words of different given tones to be tested.

19. The malfunction detector of claim 17, wherein the stuck-at-dc. detector comprises latch means for storing a tone word from a previous frame, previous sample comparator means connected to the latch means for comparing the tone word from a previous frame to the tone word to be tested and for generating a comparison result for each tone word received during the first time interval, a comparison result storage means for receiving and accumulating the comparison results during the first time interval, a stuck-at-dc. time interval comparator means connected to the storage means for comparing the comparison results accumulated by the storage means and for producing a stuck-at-dc. signal in response to all of the accumulated comparison results being the same for the first time interval, and holding means for receiving and holding the stuck-at-dc. signal.

20. The malfunction detector of claim 17, wherein the idle tone detector comprises means for producing a zero level signal in response to each tone word received with a zero digital code value during the first time interval, a zero level signal storage means for receiving and accumulating the zero level signals for the first time interval, idle tone time interval comparator means connected to the storage means for comparing the zero level output signals accumulated by the storage means and for producing an idle tone signal in response to all of the accumulated zero level output signals being the same for the first time interval, and holding means for receiving and holding the idle tone signal.

* * * * *